United States Patent
Ozeki et al.

(10) Patent No.: US 6,841,286 B2
(45) Date of Patent: Jan. 11, 2005

(54) FUEL CELL SYSTEM

(75) Inventors: Masataka Ozeki, Izumi (JP); Akinari Nakamura, Katano (JP); Shinji Miyauchi, Shiki-gun (JP); Akira Maenishi, Ikeda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 183 days.

(21) Appl. No.: 10/303,557

(22) Filed: Nov. 25, 2002

(65) Prior Publication Data

US 2003/0099875 A1 May 29, 2003

(30) Foreign Application Priority Data

Nov. 26, 2001 (JP) ........................................ 2001-358904

(51) Int. Cl.⁷ ................................................ H01M 8/04
(52) U.S. Cl. ............................. 429/34; 429/22; 429/38; 429/39; 429/17; 429/13
(58) Field of Search ............................. 429/34, 22, 38, 429/39, 17, 13

(56) References Cited

U.S. PATENT DOCUMENTS 4,810,595 A * 3/1989 Kahara et al. ................. 429/16

2003/0143445 A1 * 7/2003 Daniel et al. .................. 429/19

FOREIGN PATENT DOCUMENTS

| JP | 06-068894 | 3/1994 |
| JP | 2001-176528 | 6/2001 |

* cited by examiner

Primary Examiner—Patrick Ryan
Assistant Examiner—Angela J. Martin
(74) Attorney, Agent, or Firm—Akin Gump Strauss Hauer & Feld, LLP

(57) ABSTRACT

A fuel cell system includes: a fuel cell; a fuel generator for generating a fuel gas from a feedstock; a fuel supplying conduit for supplying the fuel gas produced by the fuel generator to the fuel cell; a fuel exhausting conduit for introducing a remaining fuel gas, which has not been consumed by the fuel cell, to a combustion chamber of the fuel generator; a first bypass conduit for connecting the fuel supplying conduit with the fuel exhausting conduit; a second bypass conduit for supplying the feedstock to the fuel exhausting conduit. The fuel cell system further comprises: either one of (1) a gas pathway switching device A installed at a junction of the fuel supplying conduit and the first bypass conduit; and (2) a gas pathway switching device B installed at a junction of the fuel exhausting conduit and the first bypass conduit. The second bypass conduit is connected to the fuel exhausting conduit at an upper stream side of the flow of the remaining fuel gas than the junction with the first bypass conduit.

8 Claims, 5 Drawing Sheets

FIG. 5

FUEL CELL SYSTEM

BACKGROUND OF THE INVENTION

Figure 5:
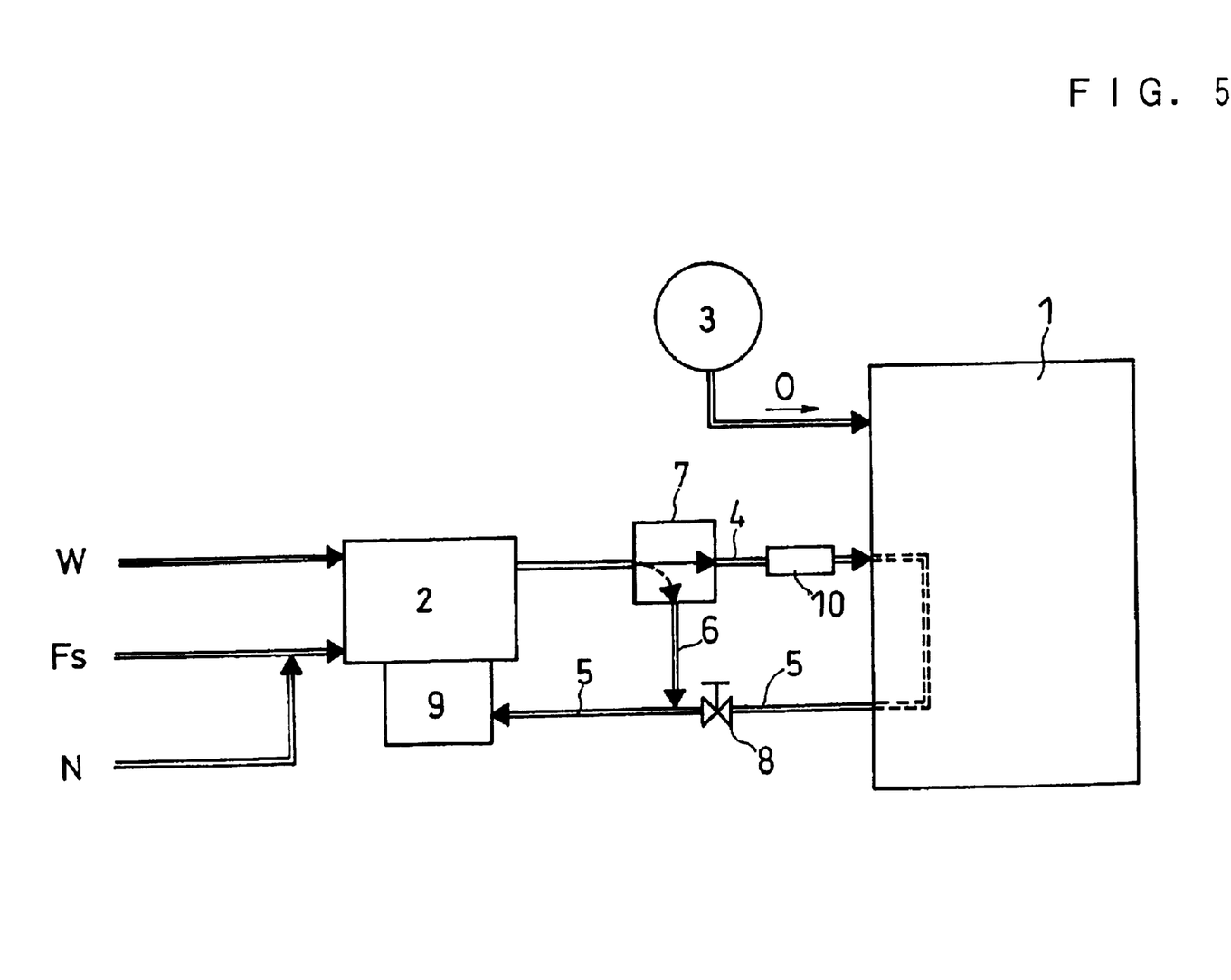
FIG. 5 schematically illustrates a configuration of a related art fuel cell system.

A related art fuel cell system is discussed below with reference to FIG. 5.

The related art fuel cell system includes a fuel cell 1 that generate electric power from a fuel gas and an oxidant gas, a fuel generator 2 that adds water (W) to a feedstock (Fs), such as natural gas, to reform the feedstock material and thereby produce a hydrogen-rich fuel gas, a blower 3 that supplies an oxidant gas (O), such as air, to the fuel cell 1, a fuel supplying conduit 4 that supplies the fuel gas produced by the fuel generator 2 to the fuel cell 1, and a fuel exhausting conduit 5 that discharges a remaining fuel gas, which has not been consumed by the fuel cell 1.

The related art fuel cell system further comprises a first bypass conduit 6 that does not feed the fuel gas to the fuel cell 1 but makes the fuel gas flow from the fuel supplying conduit 4 to the fuel exhausting conduit 5, a gas pathway switching device 7 that switches over an outflow pathway of the fuel gas between the fuel supplying conduit 4 and the first bypass conduit 6, an on-off valve 8 that prevents the fuel gas from flowing reversely or diffusing from the fuel exhausting conduit 5 to the fuel cell 1 during a feed of the fuel gas to the first bypass conduit 6, a combustion chamber 9 that burns the natural gas, the fuel gas, or the remaining fuel gas and raises the temperature in the fuel generator 2, and a filter 10 that traps undesired substances, such as a deteriorated catalyst accommodated in the fuel generator 2, to prevent the flow of such substances into the fuel cell 1.

On security grounds, while the fuel cell system does not work, the combustible gases are to be expelled from the gas pathways in the fuel cell system. Before and after operation of the fuel cell system, a nitrogen gas (N) is flown through a feedstock supplying pathway to the fuel generator 2, is subsequently circulated from the fuel generator 2, through the gas pathway switching device 7, the fuel supplying conduit 4, the first bypass conduit 6, the fuel cell 1, the fuel exhausting conduit 5, and the on-off valve 8, and is discharged from the combustion chamber 9.

At a start of the operation of the fuel cell system, the supply of nitrogen is cut off, and the feedstock is fed to the fuel generator 2. Before the fuel generator 2 reaches a preset temperature (about 700° C.), at which the hydrogen-rich fuel gas is generated, the feedstock is introduced by the gas pathway switching device 7 from the fuel generator 2 to the first bypass conduit 6, led to the combustion chamber 9 and subjected to combustion in the combustion chamber 9. When the temperature in the fuel generator 2 is raised to the preset level of approximately 700° C. by combustion of the feedstock in the combustion chamber 9, water is fed to the fuel generator 2, which then starts generation of the fuel gas.

The fuel generator 2 has a carbon monoxide removing unit that reduces the concentration of carbon monoxide contained in the fuel gas to a specific level that does not damage a catalyst in the fuel cell 1. The temperature in the carbon monoxide removing unit is varying for several tens of minutes since a start of generation of the fuel gas. The resulting fuel gas accordingly has a relatively high concentration of carbon monoxide. The fuel gas of the high carbon monoxide content is not fed to the fuel cell 1, but is introduced by the gas pathway switching device 7 to the first bypass conduit 6, led to the combustion chamber 9 and subjected to combustion in the combustion chamber 9. The on-off valve 8 is set closed to prevent the fuel gas of the high carbon monoxide content from flowing reversely from the fuel exhausting conduit 5 to the fuel cell 1.

When the temperature in the carbon monoxide removing unit of the fuel generator 2 is stabilized and the concentration of carbon monoxide contained in the fuel gas becomes not greater than 20 ppm, the on-off valve 8 is set open. The fuel gas is introduced by the gas pathway switching device 7 to the fuel supplying conduit 4 and led to the fuel cell 1. The blower 3 is simultaneously actuated to feed the oxidant gas to the fuel cell 1, which then starts power generation.

The temperature in the fuel generator 2 is kept at the preset level of approximately 700° C. by controlling the flow rate of the feedstock fed to the fuel generator 2 and thereby adjusting the quantity of the fuel gas introduced into the combustion chamber 9. In the case of the lower temperature of the fuel generator 2, the quantity of supply of the feedstock is increased to increase the fuel gas produced by the fuel generator 2 and thereby enhance the quantity of the fuel gas introduced into the combustion chamber 9. In the case of the higher temperature of the fuel generator 2, on the other hand, the quantity of supply of the feedstock is decreased to decrease the fuel gas produced by the fuel generator 2 and thereby reduce the quantity of the fuel gas introduced into the combustion chamber 9.

In the related art fuel cell system, however, the fuel cell 1 is hermetically sealed until the temperature of the carbon monoxide removing unit of the fuel generator 2 is stabilized after the start of the operation. The pressure in the fuel cell 1 may thus rise to a damaging level causing breakage of the fuel cell 1.

The fuel gas is discharged from the fuel generator 2 typically at temperatures of approximately 100° C. The gas pathway switching device 7 is accordingly required to have a heat resistance to the temperatures of about 100° C. in the related art fuel cell system. Construction of the gas pathway switching device 7 using a high heat-resistant valve, however, undesirably raises the equipment cost.

For adjustment of the temperature in the fuel generator 2, it is required to control the flow rate of the feedstock. The variation in flow rate of the feedstock results in varying the flow rate of the fuel gas supplied to the fuel cell 1 and thus does not ensure stable power generation by the fuel cell 1.

Accumulation of undesired substances on the filter 10 prevents the smooth supply of the fuel gas to the fuel cell 1. The filter 10 is thus required to have a replaceable structure. This undesirably complicates the construction of the fuel cell system, raises the equipment cost, and requires occasional maintenance. Accumulation of a large quantity of undesired substances on the filter 10 within a short time period makes the fuel cell system inoperative.

In the related art fuel cell system, circulation of nitrogen through the gas pathway before and after the operation of the system. This requires a nitrogen tank and thus undesirably raises the equipment cost. The fuel cell system can not be driven when the nitrogen tank does not contain a sufficient amount of nitrogen.

BRIEF SUMMARY OF THE INVENTION

In view of the problems of the related art system discussed above, the present invention is directed to a fuel cell system, which comprises: a fuel cell for generating electric power from a fuel gas containing hydrogen and an oxidant gas; a fuel generator for generating the fuel gas containing hydrogen from a feedstock; a fuel supplying conduit for supplying the fuel gas produced by the fuel generator to the fuel cell; a fuel exhausting conduit for introducing a remaining fuel gas, which has not been consumed by the fuel cell, from the fuel cell to a combustion chamber of the fuel generator; a first bypass conduit for connecting the fuel supplying conduit with the fuel exhausting conduit; a second bypass conduit for supplying the feedstock to the fuel exhausting conduit; and a gas pathway switching device A installed at a junction of the fuel supplying conduit and the first bypass conduit. Herein, a junction of the second bypass conduit and the fuel exhausting conduit is at an upper stream side of the flow of the remaining fuel gas than a junction of the first bypass conduit and the fuel exhausting conduit.

The present invention is also directed to a fuel cell system, which comprises: a fuel cell for generating electric power from a fuel gas containing hydrogen and an oxidant gas; a fuel generator for generating the fuel gas containing hydrogen from a feedstock; a fuel supplying conduit for supplying the fuel gas produced by the fuel generator to the fuel cell; a fuel exhausting conduit for introducing a remaining fuel gas, which has not been consumed by the fuel cell, from the fuel cell to a combustion chamber of the fuel generator; a first bypass conduit for connecting the fuel supplying conduit with the fuel exhausting conduit; a second bypass conduit for supplying the feedstock to the fuel exhausting conduit; and a gas pathway switching device B installed at a junction of the fuel exhausting conduit and the first bypass conduit. Herein, a junction of the second bypass conduit and the fuel exhausting conduit is at an upper stream side of the flow of the remaining fuel gas than a junction of the first bypass conduit and the fuel exhausting conduit.

In accordance with one preferable application of the present invention, either of the fuel cell systems described above further comprises a flow rate controlling device of the feedstock installed on the second bypass conduit.

In accordance with another preferable application of the present invention, either of the fuel cell systems described above further comprises a filter installed on the fuel supplying conduit at a lower stream side of the flow of the fuel gas than the junction of the fuel supplying conduit and the first bypass conduit and at an upper stream side of the flow of the fuel gas than the fuel cell.

In accordance with still another preferable application of the present invention, either of the fuel cell systems described above further comprises an air supplying device for supplying air to the fuel generator.

The present invention is further directed to a fuel cell system, which comprises: a fuel cell for generating electric power from a fuel gas containing hydrogen and an oxidant gas; a fuel supplying conduit for supplying the fuel gas to the fuel cell; a fuel exhausting conduit for discharging a remaining fuel gas, which has not been consumed by the fuel cell, from the fuel cell; a filter installed on the fuel supplying conduit; and a purging material supplying device for introducing a purging material through the fuel exhausting conduit and making the introduced purging material flow from a downstream toward an upstream of a fuel pathway in the fuel cell and reach an upper stream side of the flow of the fuel gas than the filter.

In accordance with one preferable application of the present invention, the fuel cell system with the purging material supplying device further comprises: a fuel generator for generating a fuel gas containing hydrogen from a feedstock; and a first bypass conduit for connecting the fuel supplying conduit with the fuel exhausting conduit. The purging material supplying device is installed at an upper stream side of the flow of the remaining fuel gas than a junction of the first bypass conduit and the fuel exhausting conduit. It is preferable that the fuel cell system with the purging material supplying device comprises either one of (1) a gas pathway switching device A installed at a junction of the fuel supplying conduit and the first bypass conduit; and (2) a gas pathway switching device B installed at a junction of the fuel exhausting conduit and the first bypass conduit.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

First Embodiment

Figure 1:
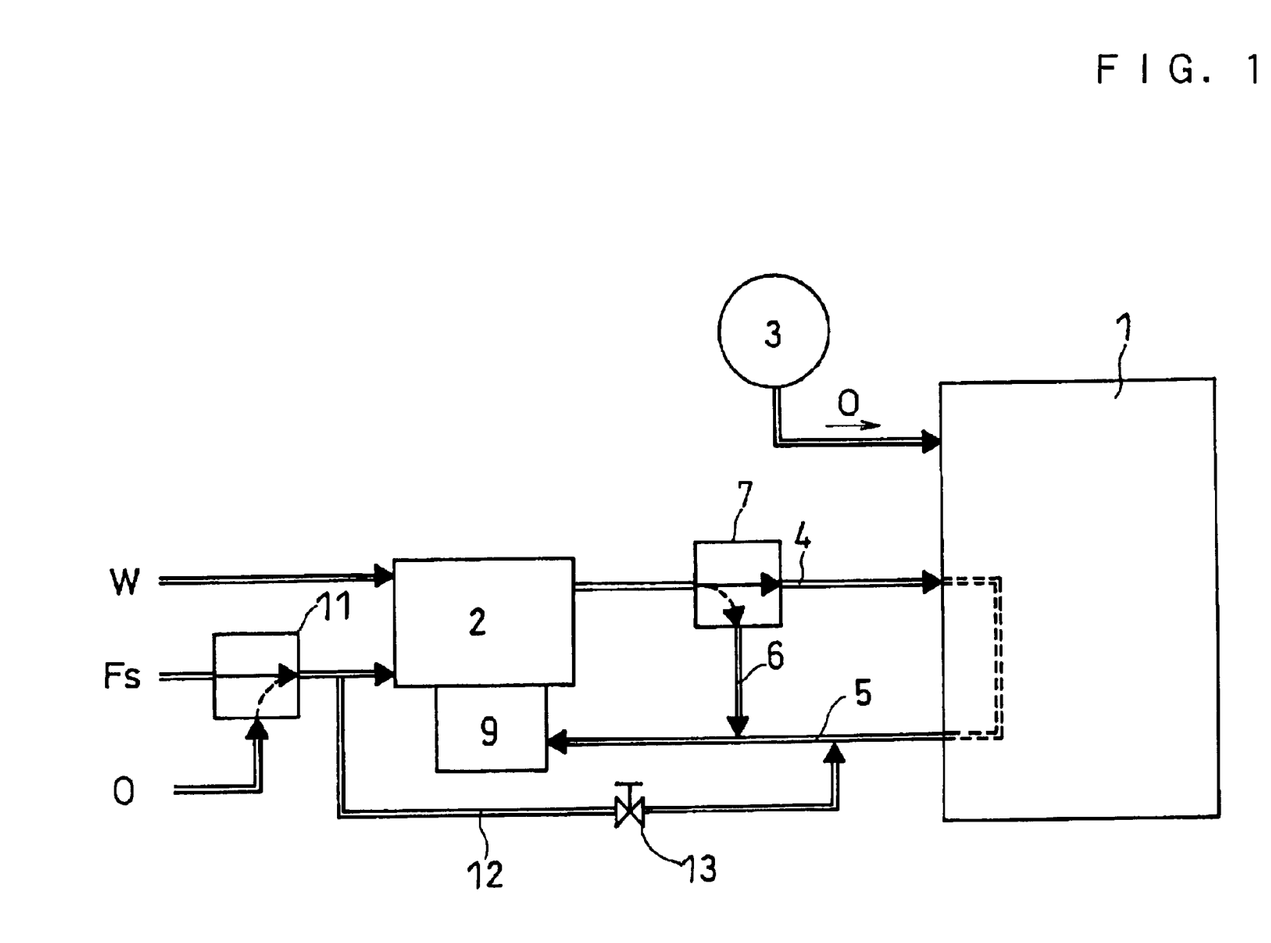
FIG. 1 schematically illustrates a configuration of a fuel cell system in the first embodiment of the present invention.

FIG. 1 schematically illustrates a configuration of a fuel cell system in this embodiment of the present invention. Constituents having a function the same as or similar to those of the related art fuel cell system shown in FIG. 5 are expressed by the same numerals.

The fuel cell system in this embodiment of the present invention comprises a fuel cell 1, a fuel generator 2, a blower 3 for feeding an oxygen-containing oxidant gas to the fuel cell 1, a fuel supplying conduit 4 for supplying a fuel gas produced by the fuel generator 2 to the fuel cell 1, a fuel exhausting conduit 5 for discharging a remaining fuel gas, which has not been consumed by the fuel cell 1, a first bypass conduit 6 for, in place of feeding the fuel gas to the fuel cell 1, feeding the fuel gas from the fuel supplying conduit 4 to the fuel exhausting conduit 5, a gas pathway switching device 7 installed at a junction of the fuel supplying conduit 4 and the first bypass conduit 6, and a combustion chamber 9 for raising the temperature in the fuel generator 2 by burning the feedstock, the fuel gas discharged from the fuel generator 2 or the remaining fuel gas discharged from the fuel cell 1.

The fuel generator 2 has a carbon monoxide removing unit filled with a predetermined catalyst. The gas pathway switching device 7 functions to switch over the outflow pathway of the gas sent from the fuel generator 2 between the fuel supplying conduit 4 and the first bypass conduit 6. For example, the gas pathway switching device 7 may be installed in the system by providing on-off valves in both the fuel supplying conduit 4 and the first bypass conduit 6 in the vicinity of a joint of the fuel supplying conduit 4 with the first bypass conduit 6. The gas is introduced into either one of the fuel supplying conduit 4 and the first bypass conduit 6 by opening one of the two on-off valves and closing the other. Setting the two on-off valves in their open positions enables the gas to be simultaneously introduced into both the fuel supplying conduit 4 and the first bypass conduit 6.

The fuel cell system also has an air supplying device 11 for introducing air into the supplying pathway of the feedstock to the fuel generator 2, and a second bypass conduit 12 for feeding the feedstock to the fuel exhausting conduit 5. A flow rate controlling device 13 for controlling the flow rate of the feedstock flown through the second bypass conduit 12 is installed on the second bypass conduit 12.

In one preferable structure, the fuel supplying conduit 4 has a filter for trapping undesired substances, such as a deteriorated catalyst produced in the fuel generator 2, to prevent the flow of such undesired substances to the fuel cell 1. The filter is installed at a lower stream side of the flow of the fuel gas than the gas pathway switching device 7 and at an upper stream side of the flow of the fuel gas than the fuel cell 1.

At the time of starting the operation of the fuel cell system, the air supplying device 11 is actuated to feed air, instead of the feedstock, to the fuel generator 2. The air is flown from the fuel generator 2 through the gas pathway switching device 7, the fuel supplying conduit 4, the fuel cell 1, and the fuel exhausting conduit 5 to the combustion chamber 9 and is discharged therefrom. The fuel cell system of this structure does not require circulation of the nitrogen gas through the gas pathway before the operation of the fuel cell system.

The gas pathway switching device 7 then switches over the outflow pathway to the first bypass conduit 6. The air is flown from the fuel generator 2 through the gas pathway switching device 7, the first bypass conduit 6, and the fuel exhausting conduit 5 to the combustion chamber 9 and is discharged therefrom. Instead of the air, nitrogen gas or feedstock may be circulated through the gas pathway.

The air circulation in the fuel cell system may be reverse to the above order. A gas pathway switching device 7 comprising two on-off valves each provided on the fuel supplying conduit 4 and the first bypass conduit 6 enables the air to be simultaneously flown into the fuel supplying conduit 4 and the first bypass conduit 6 by opening the two valves.

While a further supply of air from the air supplying device 11 to the fuel generator 2 is stopped, the feestock, such as natural gas, is fed to the fuel generator 2. The gas pathway switching device 7 is set to introduce the feedstock to the first bypass conduit 6 and send the feedstock to the combustion chamber 9 via the fuel exhausting conduit 5. The flow rate controlling device 13 is set open enough to feed the feedstock via the second bypass conduit 12 and the fuel exhausting conduit 5 to the combustion chamber 9. The feedstock fed to the combustion chamber 9 is burned, so as to start raising the temperature in the fuel generator 2.

When the temperature of the fuel generator 2 reaches a preset level of approximately 700° C., a supply of water to the fuel generator 2 is started to produce the fuel gas. When the temperature of the carbon monoxide removing unit in the fuel generator 2 is stabilized and the concentration of carbon monoxide contained in the fuel gas is reduced to a level of 20 ppm, the gas pathway switching device 7 switches over the outflow pathway to the fuel supplying conduit 4 and makes the fuel gas fed to the fuel cell 1. The flow rate controlling device 13 is then set fully closed. Simultaneously the blower 3 is actuated to feed the oxygen-containing oxidant gas to the fuel cell 1, which start power generation.

In this fuel cell system, the temperature of the fuel generator 2 is kept at the preset level of approximately 700° C. by utilizing the flow rate controlling device 13 to control the flow rate of the feedstock flown through the second bypass conduit 12 and thereby adjust the quantity of the gas introduced to the combustion chamber 9. In the case of the lower temperature of the fuel generator 2, the flow rate controlling device 13 functions to heighten the flow rate of the feedstock flown through the second bypass conduit 12 and thereby increase the quantity of combustion in the combustion chamber 9. In the case of the higher temperature of the fuel generator 2, on the other hand, the flow rate controlling device 13 functions to lower the flow rate of the feedstock flown through the second bypass conduit 12 and thereby decrease the quantity of combustion in the combustion chamber 9. Namely the flow rate of the feedstock to be introduced into the fuel generator 2 is regulated according to the required quantity of the fuel gas for stable power generation of the fuel cell 1.

Until the temperature of the carbon monoxide removing unit in the fuel generator 2 is stabilized after the start of the operation of the fuel cell system, the flow rate controlling device 13 is set open to allow the gas flown through the second bypass conduit 12 and the fuel exhausting conduit 5. This arrangement effectively prevents the fuel cell 1 from being hermetically sealed, thus preventing the pressure in the fuel cell 1 from rising to a damaging level.

At the time of stopping the operation of the fuel cell system, the supply of the feedstock to the fuel generator 2 is stopped, while only water is fed to the fuel generator 2 to produce steam with the remaining heat in the fuel generator 2. The steam is flown from the fuel generator 2 through the gas pathway switching device 7, the fuel supplying conduit 4, the fuel cell 1, and the fuel exhausting conduit 5 to the combustion chamber 9 and is discharged therefrom.

The gas pathway switching device 7 then switches over the outflow pathway to the first bypass conduit 6. The steam is flown from the fuel generator 2 through the gas pathway switching device 7, the first bypass conduit 6, and the fuel exhaust conduit 5 to the combustion chamber 9 and is discharged therefrom.

The steam circulation in the fuel cell system may be reverse to the above order. A gas pathway switching device 7 comprising two on-off valves each provided on the fuel supplying conduit 4 and the first bypass conduit 6 enables the steam to be simultaneously flown into the fuel supplying conduit 4 and the first bypass conduit 6 by opening the two valves.

The steam functions to prevent the subsequently supplied air to the system from abruptly reacting with hydrogen remaining in the system.

The supply of water to the fuel generator 2 is then stopped, and the air supplying device 11 is actuated to circulate the air in the fuel cell system. This arrangement does not require circulation of nitrogen gas through the gas pathway after the operation of the fuel cell system. The same operation as that conducted at the time of starting the fuel cell system is applied to make air flow through the fuel cell system at the time of stopping the fuel cell system.

As discussed above, the fuel cell system of this embodiment protects the fuel cell 1 from a damage due to the raised pressure, and does not require circulation of nitrogen gas through the gas pathway before and after the operation of the fuel cell system. The fuel cell system of this structure, which does not require a nitrogen tank, is manufactured at a relatively low cost and has a high reliability. There is also no trouble of falling the system into the inoperative state, due to the insufficient quantity of nitrogen left in the nitrogen tank, as is found in the related art system.

In the above embodiment, the flow rate controlling device 13 is set fully closed, after the temperature of the carbon monoxide removing unit in the fuel generator 2 becomes stabilized and the concentration of carbon monoxide contained in the fuel gas becomes a preset level of about 20 ppm. Similar effects may, however, be attained by setting the flow rate controlling device 13 open to continuously feed the gas via the second bypass conduit 12 and the fuel exhausting conduit 5 to the combustion chamber 9.

The flow rate controlling device 13 may comprise a simple on-off valve that can be set either in the open position or in the closed position. But a flow rate controlling valve that is capable of freely changing the quantity of the gas flow through the second bypass conduit 12 is preferably applied for the flow rate controlling device 13.

Second Embodiment

Figure 2:
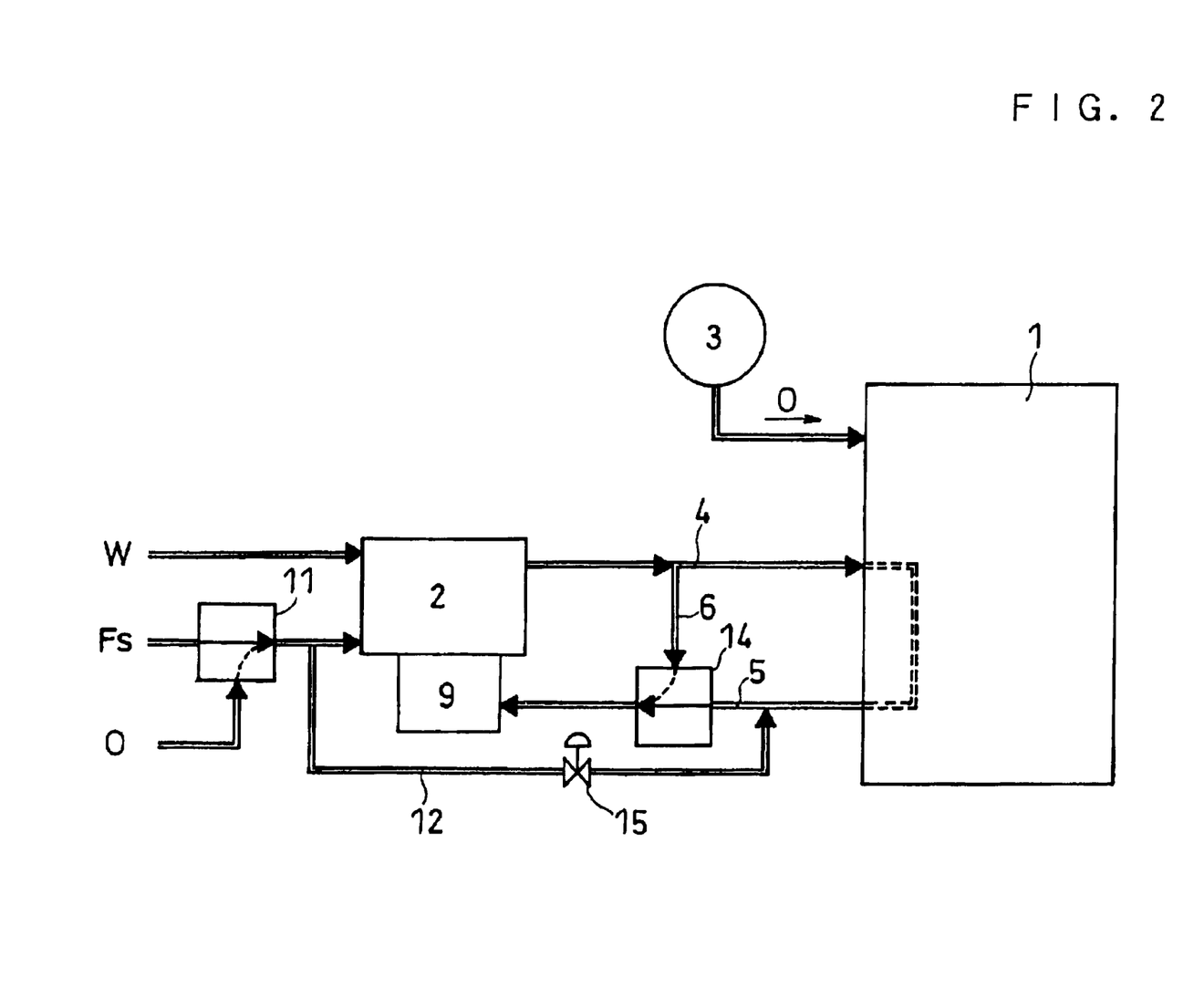
FIG. 2 schematically illustrates a configuration of a fuel cell system in the second embodiment of the present invention.

FIG. 2 schematically illustrates a configuration of a fuel cell system in this embodiment of the present invention. Constituents having a function the same as or similar to those of the system shown in FIG. 1 are expressed by the same numerals.

The fuel cell system in this embodiment of the present invention comprises a fuel cell 1, a fuel generator 2, a blower 3 for feeding air as an oxidant gas to the fuel cell 1, a fuel supplying conduit 4 for suppling a fuel gas produced by the fuel generator 2 to the fuel cell 1, a fuel exhausting conduit 5 for discharging a remaining fuel gas, which has not been consumed by the fuel cell 1, a first bypass conduit 6 for, in place of feeding the fuel gas to the fuel cell 1, feeding the fuel gas from the fuel supplying conduit 4 to the fuel exhausting conduit 5, and a combustion chamber 9 for raising the temperature in the fuel generator 2 by burning the natural gas, the fuel gas flown through the first bypass conduit 6 or the remaining fuel gas discharged from the fuel cell 1.

Figure 3:
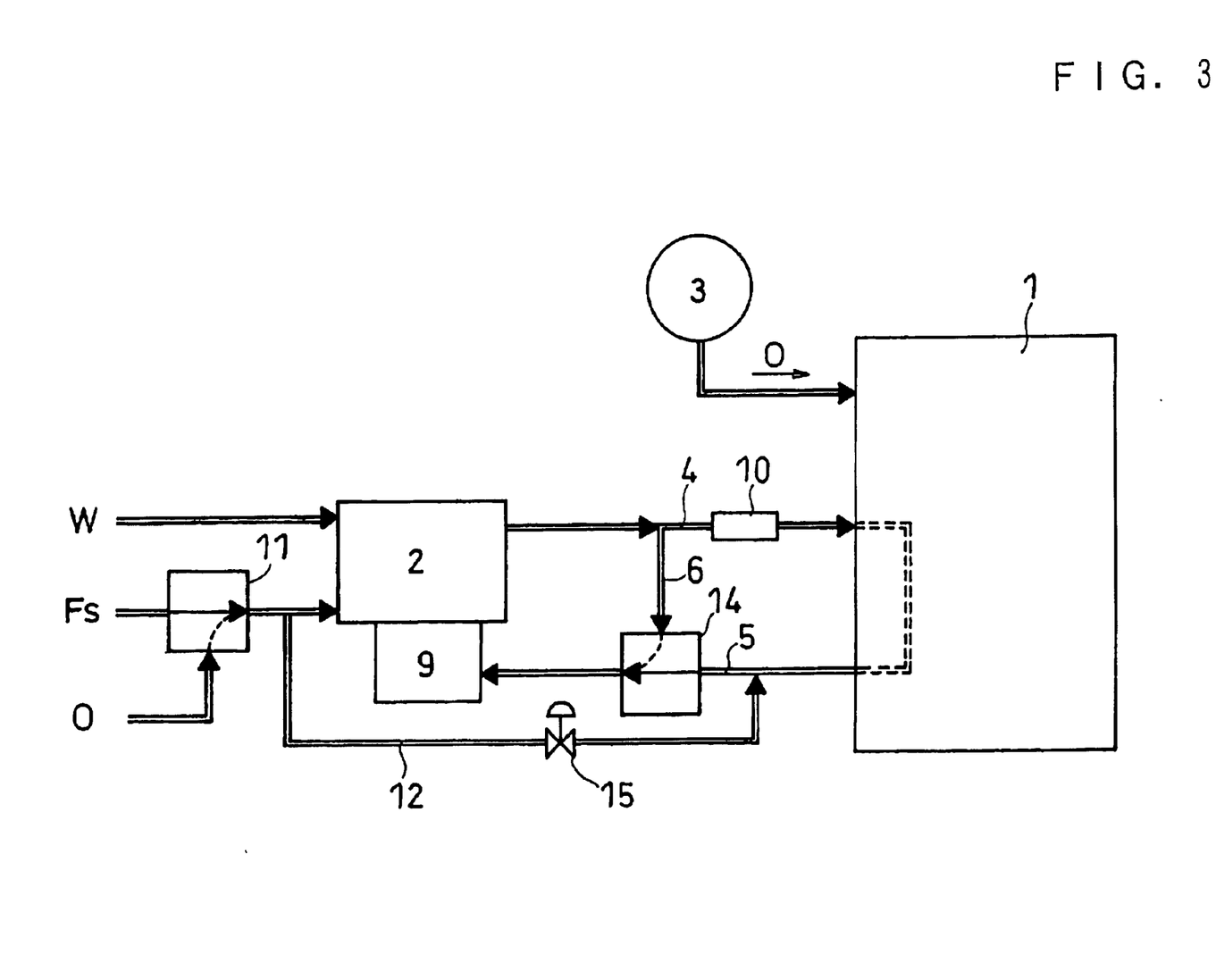
FIG. 3 schematically illustrates one modification of a fuel cell system in the second embodiment of the present invention.

The fuel generator 2 has a carbon monoxide removing unit filled with a predetermined catalyst. A filter 10 may be installed on the fuel supplying conduit 4 at a lower stream side of the flow of the fuel gas than a junction of the fuel supplying conduit 4 and the first bypass conduit 6 and at an upper stream side of the flow of the fuel gas than the fuel cell 1 as shown in FIG. 3. The filter 10 traps undesired substances from the fuel generator 2 to prevent the undesired substances from flowing into the fuel cell 1.

The fuel cell system further has a gas pathway switching device 14 installed at a junction of the fuel exhausting conduit 5 and the first bypass conduit 6, an air supplying device 11 for feeding air to the supplying pathway of the feedstock to the fuel generator 2, a second bypass conduit 12 for feeding the feedstock to the fuel exhausting conduit 5, and a flow rate controlling device 15 for controlling the flow rate of the feedstock flown through the second bypass conduit 12.

The gas pathway switching device 14 functions to switch over the outflow pathway of the gas discharged from the fuel generator 2 between the fuel supplying conduit 4 and the first bypass conduit 6. For example, the gas pathway switching device 14 may be installed in the system by providing on-off valves in both the fuel exhausting conduit 5 and the first bypass conduit 6 in the vicinity of a joint of the fuel exhausting conduit 5 with the first bypass conduit 6. The gas is introduced into either one of the fuel supplying conduit 4 and the first bypass conduit 6 by opening one of the two on-off valves and closing the other. Setting the two on-off valves in their open positions enables the gas to be simultaneously introduced into both the fuel supplying conduit 4 and the first bypass conduit 6.

At the time of starting the operation of the fuel cell system, the air supplying device 11 is actuated to feed air, instead of the feedstock, to the fuel generator 2. The air is flown from the fuel generator 2 through the fuel supplying conduit 4, the fuel cell 1, the gas pathway switching device 14, and the fuel exhausting conduit 5 to the combustion chamber 9 and is discharged therefrom. The fuel cell system of this structure does not require circulation of nitrogen gas through the gas pathway before the operation of the fuel cell system.

The gas pathway switching device 14 then switches over the inflow pathway to the first bypass conduit 6. The air is flown from the fuel generator 2 through the first bypass conduit 6, the gas pathway switching device 14, and the fuel exhausting conduit 5 to the combustion chamber 9 and is discharged therefrom. Instead of the air, nitrogen gas or feedstock may be circulated through the gas pathway.

The air circulation in the fuel cell system may be reverse to the above order. A gas pathway switching device 14 comprising two on-off valves each provided on the fuel exhausting conduit 5 and the first bypass conduit 6 enables air to be simultaneously flown into the fuel supplying conduit 4 and the first bypass conduit 6 by opening the two valves.

While a further supply of air from the air supplying device 11 to the fuel generator 2 is stopped, the feedstock, such as natural gas, is fed to the fuel generator 2. The feedstock is then supplied to the combustion chamber 9 via the first bypass conduit 6 and the gas pathway switching device 14. The feedstock is also supplied to the combustion chamber 9 via the second bypass conduit 12, the fuel exhausting conduit 5, the fuel cell 1, the fuel supplying conduit 4, the first bypass conduit 6, and the gas pathway switching device 14 to the combustion chamber 9, so as to start raising the temperature in the fuel generator 2.

When the temperature of the fuel generator 2 reaches a preset level of approximately 700° C., a supply of water to the fuel generator 2 is started to produce the fuel gas. When the temperature of the carbon monoxide removing unit in the fuel generator 2 is stabilized and the concentration of carbon monoxide contained in the fuel gas is reduced to a level of 20 ppm, the gas pathway switching device 14 switches over the inflow pathway to the fuel exhausting conduit 5 and makes the fuel gas fed to the fuel cell 1. In the meantime, the feedstock is supplied to the combustion chamber 9 via the second bypass conduit 12, the fuel exhausting conduit 5, and the gas pathway switching device 14. Simultaneously the blower 3 is actuated to feed the oxygen-containing oxidant gas to the fuel cell 1, which start power generation.

As described above, until the temperature of the carbon monoxide removing unit in the fuel generator 2 is stabilized after the start of the operation of the fuel cell system, the feedstock is circulated through the second bypass conduit 12, the fuel exhaust conduit 5, the fuel cell 1, the fuel supplying conduit 4, the first bypass conduit 6, and the gas pathway switching device 14 in this order. This arrangement effectively prevents the fuel cell 1 from being hermetically sealed, thus preventing the pressure in the fuel cell 1 from rising to a damaging level.

A cooling means for keeping the fuel cell 1 driven at a substantially constant temperature makes the temperature of the gas discharged from the fuel cell 1 lower than the temperature of the gas fed to the fuel cell 1. Arrangement of the gas pathway switching device 14 at the downstream side of the fuel cell 1 desirably lowers the temperature of the gas flown through the gas pathway switching device 14. This arrangement does not require the valves in the gas pathway switching device to have high heat resistance and thus reduces the equipment cost.

The flow rate controlling device 15 may comprise a simple on-off valve that can be set either in the open position or in the closed position. But a flow rate controlling valve that is capable of freely changing the quantity of the gas flow through the second bypass conduit 12 is preferably applied for the flow rate controlling device 15.

At the time of stopping the operation of the fuel cell system, while the supply of the feedstock to the fuel generator 2 is stopped, only water is fed to the fuel generator 2 to produce steam with the remaining heat in the fuel generator 2. The steam is flown through the first bypass conduit 6 and the gas pathway switching device 14 and is discharged from the combustion chamber 9.

The flow rate controlling device 15 is set open to feed the natural gas to the combustion chamber 9 via the second bypass conduit 12, the fuel exhausting conduit 5, the fuel cell 1, the fuel supplying conduit 4, the first bypass conduit 6, and the gas pathway switching device 14. The natural gas is burned in the combustion chamber 9.

The supply of water to the fuel generator 2 is then stopped, and the air supplying device 11 is actuated to feed air to the fuel generator 2. The air is flown from the fuel generator 2 through the fuel supplying conduit 4, the first bypass conduit 6, the fuel cell 1, and the fuel exhausting conduit 5 to the combustion chamber 9 and is discharged therefrom. This arrangement does not require circulation of nitrogen gas through the gas pathway after the operation of the fuel cell system.

As discussed above, the fuel cell system of this embodiment protects the fuel cell 1 from a damage due to the raised pressure, and does not require circulation of nitrogen gas through the gas pathway before and after the operation of the fuel cell system. The fuel cell system of this structure, which does not require a nitrogen tank, is manufactured at a relatively low cost and has a high reliability. There is also no trouble of falling the system into the inoperative state, due to the insufficient quantity of nitrogen left in the nitrogen tank, as is found in the related art system.

The fuel cell system of this embodiment has the flow rate controlling device 15 to control the flow rate of the feedstock fed from the second bypass conduit 12 to the combustion chamber 9 via the fuel exhausting conduit 5 and the gas pathway switching device 14. This arrangement attains adjustment of the temperature in the fuel generator 2 without varying the quantity of the feedstock supplied to the fuel generator 2, thus ensuring a stable, constant supply of the fuel gas to the fuel cell 1.

Additionally, in the fuel cell system of this embodiment, the feedstock or air is circulated through the second bypass conduit 12, the fuel exhausting conduit 5, the fuel cell 1, the fuel supplying conduit 4, the first bypass conduit 6, and the gas pathway switching device 14 in this order, before and after the operation of the fuel cell system. In one modified structure of the fuel cell system of this embodiment, a filter 10 may be installed on the fuel supplying conduit 4 between the junction of the fuel supplying conduit 4 and the first bypass conduit 6 and the fuel cell 1, as shown in FIG. 3. In this modified structure, before and after the operation of the fuel cell system, the gas is flown to the filter 10 in a reverse direction to the gas flow during power generation by the fuel cell 1. Undesired substances accumulated on the filter 10 are accordingly flown through the fuel supplying conduit 4, the first bypass conduit 6, and the gas pathway switching device 14 and are subjected to combustion in the combustion chamber 9 or are discharged outside. The filter 10 is accordingly not required to have any replaceable structure. This arrangement simplifies the construction of the fuel cell system and facilitates the maintenance. The arrangement thus attains a system that is manufactured at a relatively low cost and continues stable power generation.

In the first and the second embodiments, by taking into account the supply of air to the fuel generator 2, the carbon monoxide removing unit for the fuel generator 2 should be constructed by a catalyst having a resistance to an oxidizing atmosphere. Typical examples are noble metal catalysts.

Third Embodiment

Figure 4:
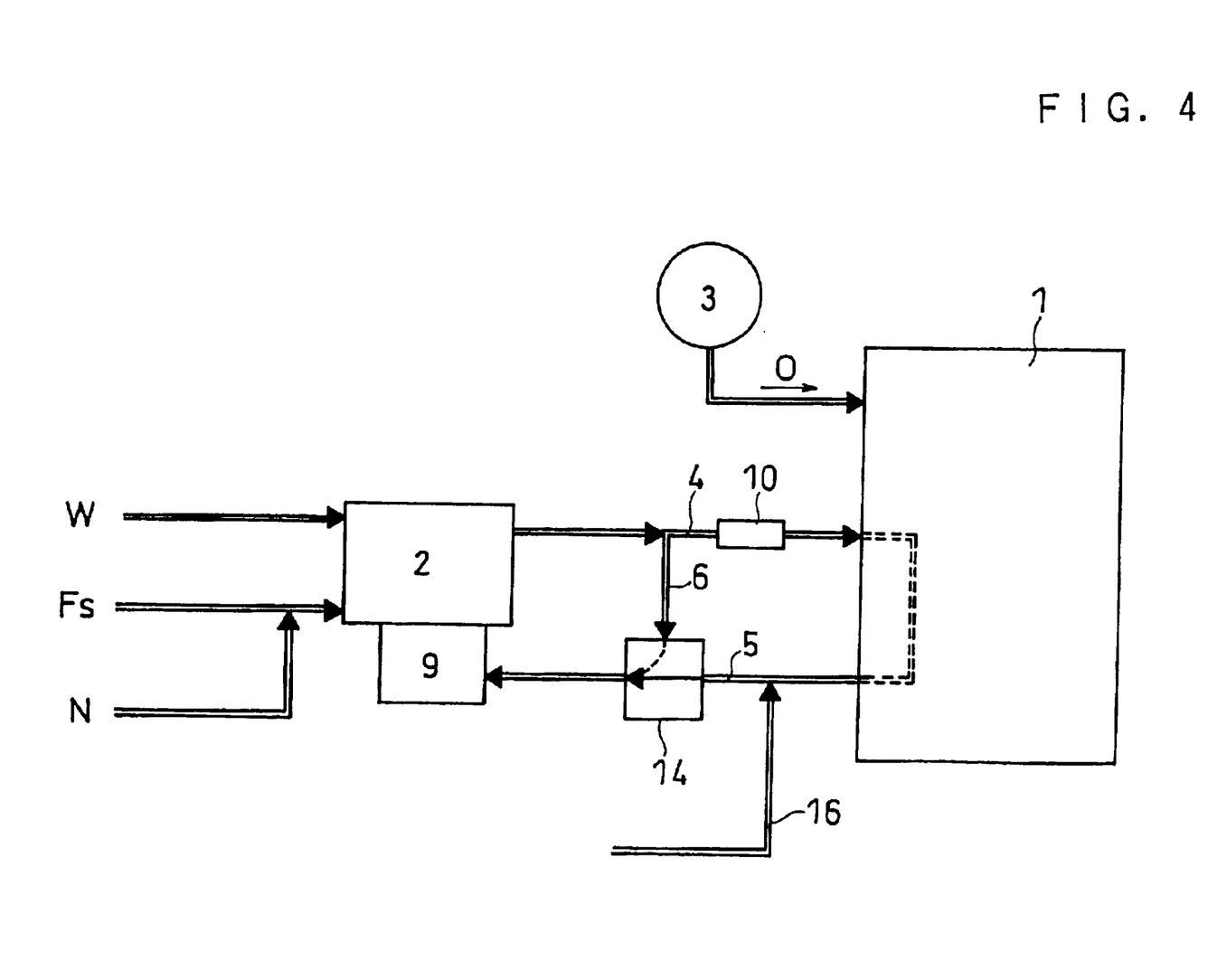
FIG. 4 schematically illustrates a configuration of a fuel cell system in the third embodiment of the present invention.

FIG. 4 schematically illustrates a configuration of a fuel cell system in this embodiment of the present invention. Constituents having a function the same as or similar to those of the systems shown in FIGS. 1 through 3 are expressed by the same numerals.

The fuel cell system in this embodiment of the present invention comprises a fuel cell 1, a fuel generator 2, a blower 3 for feeding air as an oxidant gas to the fuel cell 1, a fuel supplying conduit 4 for supplying a fuel gas produced by the fuel generator 2 to the fuel cell 1, a fuel exhausting conduit 5 for discharging a remaining fuel gas, which has not been consumed by the fuel cell 1, a first bypass conduit 6 for, in place of feeding the fuel gas to the fuel cell 1, feeding the fuel gas from the fuel supplying conduit 4 to the fuel exhausting conduit 5, a combustion chamber 9 for raising the temperature in the fuel generator 2 by burning the feedstock or the fuel gas flown through the first bypass conduit 6 or the remaining fuel gas discharged from the fuel cell 1, and a filter 10 for trapping undesired substances from the fuel generator 2 to prevent the undesired substances from flowing into the fuel cell 1.

The fuel generator 2 has a carbon monoxide removing unit filled with a predetermined catalyst. The filter 10 is installed on the fuel supplying conduit 4 at a lower stream side of the flow of the fuel gas than a junction of the fuel supplying conduit 4 and the first bypass conduit 6 and at an upper stream side of the flow of the fuel gas than the fuel cell 1.

The fuel cell system further has a gas pathway switching device 14 installed at a junction of the fuel exhausting conduit 5 and the first bypass conduit 6, and a purging material supplying device 16 for making a purging material flow through the fuel exhausting conduit 5 and the fuel cell 1 and reach the upper stream side of the flow of the fuel gas than the filter 10.

The gas pathway switching device 14 may have the same structure as that of the second embodiment. A typical example of the purging material is nitrogen gas.

On security grounds, while the fuel cell system does not work, the combustible gases are to be expelled from the gas pathways in the fuel cell system. Before and after operation of the fuel cell system, nitrogen gas is introduced from the supplying pathway of the feedstock to the fuel generator 2. The nitrogen gas is flown from the fuel generator 2 through the first bypass conduit 6 and the gas pathway switching device 14 and is discharged from the combustion chamber 9. Simultaneously the purging material, such as nitrogen gas, is flown from the purging material supplying device 16 through the fuel exhausting conduit 5, the fuel cell 1, the fuel supplying conduit 4, and the gas pathway switching device 14 and is discharged from the combustion chamber 9.

At the time of starting the operation of the fuel cell system, while the supply of nitrogen gas to the fuel generator 2 is stopped, the feedstock is fed to the fuel generator 2. The feedstock is flown through the first bypass conduit 6 and the gas pathway switching device 14 and is led to the combustion chamber 9. The feedstock is subjected to combustion in the combustion chamber 9 to start raising the temperature in the fuel generator 2. In this state, the supply of the purging material is continuously fed from the purging material supplying device 16 to the combustion chamber 9 via the fuel exhausting conduit 5, the fuel cell 1, the fuel supplying conduit 4, and the gas pathway switching device 14. The feedstock discharged from the fuel generator 2 accordingly does not reach the fuel cell 1 via the filter 10, but is introduced into the first bypass conduit 6.

Until the temperature of the carbon monoxide removing unit in the fuel generator 2 is stabilized after the start of the operation of the fuel cell system, the purging material is flown from the purging material supplying device 16 to the combustion chamber 9 via the fuel exhausting conduit 5, the fuel cell 1, the filter 10, the fuel supplying conduit 4, the first bypass conduit 6, and the gas pathway switching device 14. This arrangement effectively prevents the fuel cell 1 from being hermetically sealed, thus preventing the pressure in the fuel cell 1 from rising to a damaging level.

A cooling means for keeping the fuel cell 1 driven at a substantially constant temperature makes the temperature of the gas discharged from the fuel cell 1 lower than the temperature of the gas fed to the fuel cell 1. Arrangement of the gas pathway switching device 14 at the downstream side of the fuel cell 1 desirably lowers the temperature of the gas flown through the gas pathway switching device 14. This arrangement does not require the valves in the gas pathway switching device to have high heat resistance and thus reduces the equipment cost.

When the temperature of the fuel generator 2 reaches a preset level of approximately 700° C., a supply of water to the fuel generator 2 is started to produce the fuel gas. When the temperature of the carbon monoxide removing unit in the fuel generator 2 is stabilized and the concentration of carbon monoxide contained in the fuel gas is reduced to a level of 20 ppm, the gas pathway switching device 14 switches over the inflow pathway to the fuel exhausting conduit 5 and makes the fuel gas fed to the fuel cell 1 via the fuel supplying conduit 4 and the filter 10. Simultaneously the supply of the nitrogen gas to the fuel exhausting conduit 5 is stopped. The blower 3 is actuated to feed the oxygen-containing oxidant gas to the fuel cell 1, which start power generation.

The temperature in the fuel generator 2 is kept at the preset level of approximately 700° C. by controlling the flow rate of the feedstock fed to the fuel generator 2 and thereby adjusting the quantity of the fuel gas introduced to the combustion chamber 9. In the case of the lower temperature of the fuel generator 2, the quantity of supply of the feedstock is heightened to increase the quantity of the fuel gas produced by the fuel generator 2. This increases the supply of the fuel gas to the combustion chamber 9 and thus enhances the quantity of combustion. In the case of the higher temperature of the fuel generator 2, on the other hand, the quantity of supply of the feedstock is lowered to decrease the quantity of the fuel gas produced by the fuel generator 2. This decreases the supply of the fuel gas to the combustion chamber 9 and thus reduces the quantity of combustion.

In the fuel cell system of this embodiment, before and after operation of the fuel cell system, the purging material is flown from the purging material supplying device 16 and is circulated through the fuel exhausting conduit 5, the fuel cell 1, the filter 10, the fuel supplying conduit 4, the first bypass conduit 6, and the gas pathway switching device 14 in this order. The flow of the gas through the filter 10 at this moment is reverse to the gas flow at the time of power generation by the fuel cell 1. The undesired substances accumulated on the filter 10 are thus flown through the fuel supplying conduit 4, the first bypass conduit 6, and the gas pathway switching device 14 and are subjected to combustion in the combustion chamber 9 or are discharged outside. The filter 10 is accordingly not required to have any replaceable structure. This arrangement simplifies the construction of the fuel cell system and facilitates the maintenance. The arrangement thus attains a system that is manufactured at a relatively low cost and continues stable power generation.

As described above, the fuel cell system of the present invention is manufactured at a relatively low cost and ensures stable power generation.

Specifically, a fuel cell system of the present invention has a first bypass conduit for connecting the fuel supplying conduit with the fuel exhausting conduit, and a second bypass conduit for feeding the feedstock to the fuel exhausting conduit. The second bypass conduit is connected to the fuel exhausting conduit at an upper stream side of the flow of the remaining fuel gas than the first bypass conduit. This structure ensures the flow of the feedstock to the fuel exhausting conduit and effectively prevents the fuel cell from being hermetically sealed, thus preventing the pressure in the fuel cell from rising to a damaging level.

In a fuel cell system of the present invention, arrangement of a gas pathway switching device on the fuel exhausting conduit desirably lowers the temperature of the gas flown through the gas pathway switching device. In the case where the gas pathway switching device is constructed by a valve or the likes, this arrangement does not require the valve to have the high heat resistance and thus reduces the equipment cost.

In a fuel cell system of the present invention, arrangement of a flow rate controlling device of the feedstock on the second bypass conduit keeps the sufficient supply of the fuel gas required for power generation to the fuel cell, thus ensuring stable operation of the fuel cell.

In a fuel cell system of the present invention, arrangement of a filter on the fuel supplying conduit at the lower stream side of the flow of the fuel gas than the junction of the fuel supplying conduit and the first bypass conduit desirably allows the gas flown in a reverse direction to the flow of the fuel gas and thus enables the undesired substances accumulated on the filter to be subjected to combustion in the combustion chamber or to be discharged outside, before and after the operation of the fuel cell. The filter is accordingly not required to have any replaceable structure. This arrangement simplifies the construction of the fuel cell system, reduces the equipment cost, and facilitates the maintenance.

A fuel cell system of the present invention has a air supplying device to feed air to the fuel generator. This arrangement does not require nitrogen gas to be flown through the fuel gas pathway before and after the operation of the fuel cell system. The system accordingly does not require a nitrogen tank and desirably reduces the equipment cost. There is also no trouble of falling the system into the inoperative state, due to the insufficient quantity of nitrogen left in the nitrogen tank, as is found in the related art system.

A fuel cell system of the invention has a filter installed on the fuel supplying conduit, and a purging material supplying device for making the purging material flow through the fuel exhausting conduit and the fuel cell and reach the upper stream side of the flow of the fuel gas than the filter. The purging material is thus flown in a reverse direction to the flow of the fuel gas, before and after operation of the fuel cell. The undesired substances accumulated on the filter are accordingly subjected to combustion or discharged outside. The filter is thus not required to have any replaceable structure. This desirably simplifies the construction of the fuel cell system, reduces the equipment cost, and facilitates the maintenance.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A fuel cell system, comprising:
    a fuel cell for generating electric power from a fuel gas and an oxidant gas, the fuel gas containing hydrogen;
    a fuel generator for generating the fuel gas from a feedstock;
    a fuel supplying conduit for supplying the fuel gas produced by said fuel generator to said fuel cell;
    a fuel exhausting conduit for introducing a remaining fuel gas from said fuel cell to a combustion chamber of said fuel generator, the remaining fuel gas having not been consumed by said fuel cell;
    a first bypass conduit for connecting said fuel supplying conduit with said fuel exhausting conduit;
    a second bypass conduit for supplying the feedstock to said fuel exhausting conduit; and
    a gas pathway switching device A installed at a junction of said fuel supplying conduit and said first bypass conduit;
    a junction of said second bypass conduit and said fuel exhausting conduit being at an upper stream side of the flow of the remaining fuel gas than a junction of said first bypass conduit and said fuel exhausting conduit.

2. The fuel cell system in accordance with claim 1, further comprising a flow rate controlling device of the feedstock installed on said second bypass conduit.

3. The fuel cell system in accordance with claim 1, further comprising a filter installed on said fuel supplying conduit at a lower stream side of the flow of the fuel gas than a junction of said fuel supplying conduit and said first bypass conduit and at an upper stream side of the flow of the fuel gas than said fuel cell.

4. The fuel cell system in accordance with claim 1, further comprising an air supplying device for supplying air to said fuel generator.

5. A fuel cell system, comprising:
    a fuel cell for generating electric power from a fuel gas and an oxidant gas, the fuel gas containing hydrogen;
    a fuel generator for generating the fuel gas from a feedstock;
    a fuel supplying conduit for supplying the fuel gas produced by said fuel generator to said fuel cell;
    a fuel exhausting conduit for introducing a remaining fuel gas from said fuel cell to a combustion chamber of said fuel generator, the remaining fuel gas having not been consumed by said fuel cell;
    a first bypass conduit for connecting said fuel supplying conduit with said fuel exhausting conduit;
    a second bypass conduit for supplying the feedstock to said fuel exhausting conduit; and
    a gas pathway switching device B installed at a junction of said fuel exhausting conduit and said first bypass conduit,
    a junction of said second bypass conduit and said fuel exhausting conduit being at an upper stream side of the flow of the remaining fuel gas than a junction of said first bypass conduit and said fuel exhausting conduit.

6. The fuel cell system in accordance with claim 5, further comprising a flow rate controlling device of the feedstock installed on said second bypass conduit.

7. The fuel cell system in accordance with claim 5, further comprising a filter installed on said fuel supplying conduit at a lower stream side of the flow of the fuel gas than a junction of said fuel supplying conduit and said first bypass conduit and at an upper stream side of the flow of the fuel gas than said fuel cell.

8. The fuel cell system in accordance with claim 5, further comprising an air supplying device for supplying air to said fuel generator.

* * * * *